United States Patent
Ogawa

(10) Patent No.: US 11,521,478 B2
(45) Date of Patent: Dec. 6, 2022

(54) LEFT-BEHIND DETECTION DEVICE AND LEFT-BEHIND DETECTION METHOD

(71) Applicant: Mitsubishi Electric Corporation, Tokyo (JP)

(72) Inventor: Yoshiyuki Ogawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/278,376

(22) PCT Filed: Sep. 27, 2018

(86) PCT No.: PCT/JP2018/035862
§ 371 (c)(1),
(2) Date: Mar. 22, 2021

(87) PCT Pub. No.: WO2020/065811
PCT Pub. Date: Apr. 2, 2020

(65) Prior Publication Data
US 2021/0350688 A1   Nov. 11, 2021

(51) Int. Cl.
*G08B 21/24* (2006.01)
*H04N 7/18* (2006.01)
(Continued)

(52) U.S. Cl.
CPC .............. *G08B 21/24* (2013.01); *G06V 20/59* (2022.01); *G06V 40/10* (2022.01); *H04N 7/183* (2013.01); *B60Q 5/005* (2013.01)

(58) Field of Classification Search
CPC ............... G08B 21/24; G06K 9/00362; G06K 9/00832; H04N 7/183; B60Q 5/005
See application file for complete search history.

(56) References Cited

U.S. PATENT DOCUMENTS 10,115,029 B1 * 10/2018 Day ...................... G06V 20/59
2003/0098784 A1   5/2003 Van Bosch et al.
(Continued)

FOREIGN PATENT DOCUMENTS

CN   105427529 A   3/2016
CN   105882529 A * 8/2016
(Continued)

OTHER PUBLICATIONS

Office Action dated Jan. 17, 2022 in Chinese Application No. 201880097838.3; 19 pages with translation.
(Continued)

*Primary Examiner* — Brian Wilson
(74) *Attorney, Agent, or Firm* — Sughrue Mion, PLLC; Richard C. Turner

(57) ABSTRACT

A vehicle information acquiring unit for acquiring vehicle information; a heat source information acquiring unit for acquiring heat source information; a stop determining unit for determining whether or not a vehicle is stopped on the basis of the vehicle information; a heat source determining unit for determining whether or not a heat source satisfying a target condition is generated in the vehicle on the basis of the heat source information, when the stop determining unit determines that the vehicle is stopped; an activation control unit for activating an imaging device, when the heat source determining unit determines that a heat source satisfying the target condition is generated; an image acquiring unit acquiring a captured image of inside of the vehicle from the imaging device; and a notification control unit outputting notification information to the outside of the vehicle, when a living body is detected in the captured image.

5 Claims, 10 Drawing Sheets

(51) Int. Cl.
    *G06V 20/59*     (2022.01)
    *G06V 40/10*     (2022.01)
    *B60Q 5/00*     (2006.01)

(56) References Cited

U.S. PATENT DOCUMENTS

| | | | |
|---|---|---|---|
| 2009/0204297 A1* | 8/2009 | Friedman | B60H 1/00742 |
| | | | 701/46 |
| 2014/0184404 A1 | 7/2014 | Schoenberg et al. | |
| 2014/0306833 A1* | 10/2014 | Ricci | G06F 21/00 |
| | | | 340/901 |
| 2016/0272112 A1* | 9/2016 | DeGrazia | B60Q 9/00 |
| 2017/0240022 A1* | 8/2017 | Ireri | A61B 5/01 |
| 2018/0197033 A1* | 7/2018 | Geng | G06V 10/25 |
| 2020/0071967 A1* | 3/2020 | Adams | G08B 21/24 |

FOREIGN PATENT DOCUMENTS

| | | | |
|---|---|---|---|
| CN | 106022235 A | 10/2016 | |
| CN | 106218571 A | 12/2016 | |
| DE | 102011011939 A1 | 8/2012 | |
| JP | 2002-063668 A | 2/2002 | |

OTHER PUBLICATIONS

Communication dated Nov. 23, 2021 from the German Patent and Trademark Office in Application No. 112018007911.2.
Communication dated Oct. 14, 2022 by the Chinese Intellectual Property Office in Chinese Application No. 201880097838.3.

* cited by examiner

LEFT-BEHIND DETECTION DEVICE AND LEFT-BEHIND DETECTION METHOD

CROSS REFERENCE TO RELATED APPLICATIONS

This application is a National Stage of International Application No. PCT/JP2018/035862 filed on Sep. 27, 2018.

TECHNICAL FIELD

The present invention relates to a left-behind detection device and a left-behind detection method for detecting, for example, a person left behind in a vehicle.

BACKGROUND ART

In the related art, there is known technology for detecting a person or an animal (hereinafter referred to as a "living body") left behind in a vehicle.

For example, Patent Literature 1 discloses an in-vehicle person detecting and reporting device that detects a person inside a vehicle and outputs a person detection report to the outside of the vehicle. In the person detecting and reporting device disclosed in Patent Literature 1, the presence or absence of a person or an object is determined from mass distribution on seats that is read from a plurality of mass sensors laid on the seats of the vehicle, and in a case where it is determined there is a person or an object, a camera is activated and discrimination between a person and an object is made from an image captured by the camera. An in a case where a person is detected, a person detection report is output.

CITATION LIST

Patent Literature
Patent Literature 1: JP 2002-63668 A

SUMMARY OF INVENTION

Technical Problem

In the conventional technology represented by the technology of the in-vehicle person detecting and reporting device as disclosed in Patent Literature 1, whether or not a person or an object exists is determined from a mass distribution acquired from a mass sensor before activation of a camera. However, there is a disadvantage that it is difficult to determine whether or not it is a living body from the detection of a living body by the mass sensor.

The present invention has been made to solve disadvantages as the above, and it is an object of the present invention to provide a left-behind detection device capable of detecting the presence of a living body left behind in a vehicle before an imaging device is activated.

Solution To Problem

A left-behind detection device according to the present invention includes: processing circuitry to acquire vehicle information related to a vehicle; to acquire heat source information related to a heat source in the vehicle; to determine whether or not the vehicle is stopped on the basis of the acquired vehicle information to determine whether or not a heat source satisfying a target condition is generated in the vehicle on the basis of the acquired heat source information, when the processing circuitry determines that the vehicle is stopped; to activate an imaging device, when the processing circuitry determines that a heat source satisfying the target condition is generated; to acquire a captured image capturing an inside of the vehicle from the activated imaging device; and to output notification information to an outside of the vehicle, when a living body is detected in the acquired captured image.

Advantageous Effects Of Invention

According to the present invention, it is possible to detect the presence of a living body left behind in the vehicle before activation of an imaging device.

DESCRIPTION OF EMBODIMENTS

Hereinafter, embodiments of the present invention will be described in detail with reference to the drawings.

First Embodiment

Figure 1:
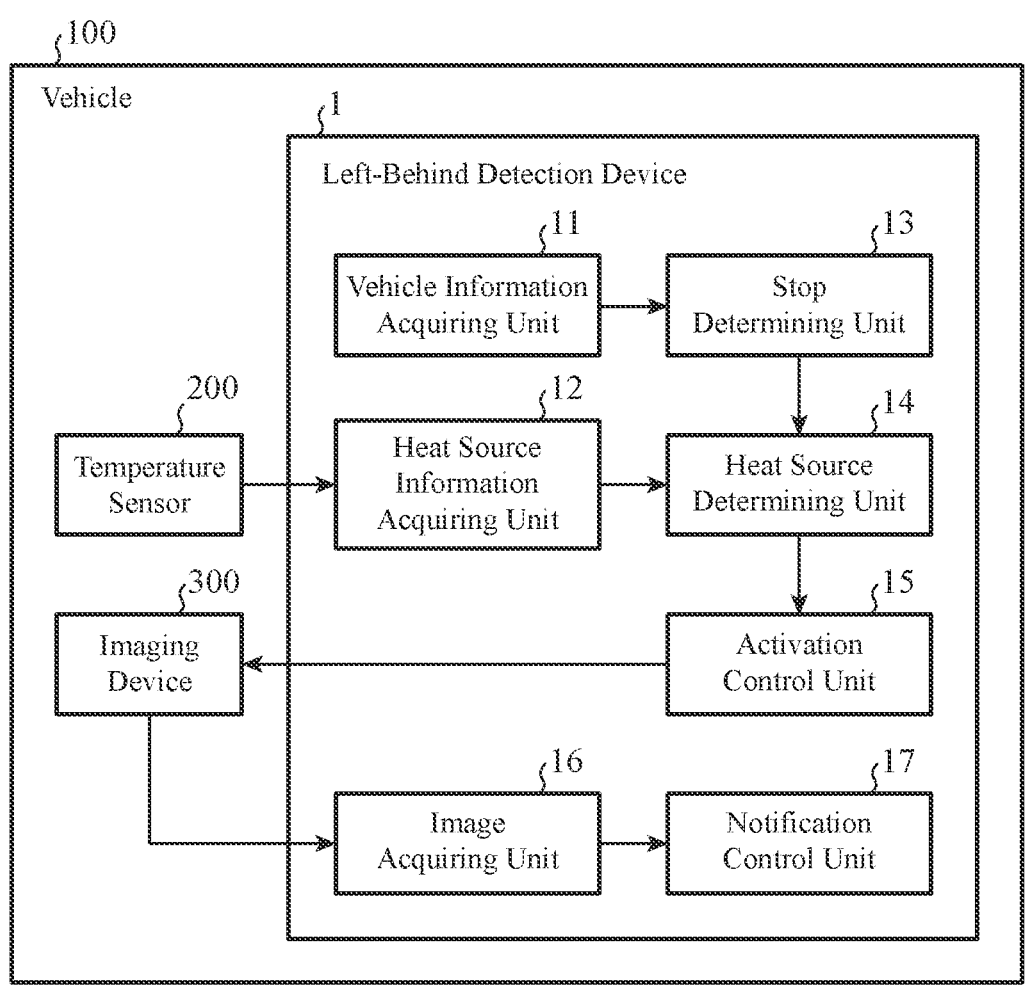
FIG. 1 is a diagram illustrating a configuration example of a left-behind detection device according to a first embodiment.

FIG. 1 is a diagram illustrating a configuration example of a left-behind detection device 1 according to a first embodiment.

The left-behind detection device 1 is mounted on, for example, a vehicle 100.

As illustrated in FIG. 1, the vehicle 100 is mounted with a temperature sensor 200 and an imaging device 300 in addition to the left-behind detection device 1.

The temperature sensor 200 is, for example, an infrared sensor, and detects a heat source generated in the vehicle 100. In the first embodiment, a heat source refers to a point or an area having a higher temperature than that of its surroundings. Note that in a case where a plurality of heat sources is generated in vehicle 100, the temperature sensor 200 detects each of the heat sources.

At least one temperature sensor 200 is installed in the vehicle 100. For example, one temperature sensor 200 may be installed in the vehicle 100, and the one temperature sensor 200 may detect a heat source generated in the entire area of the vehicle 100. Alternatively, a temperature sensor 200 may be installed for each of the seats, and each temperature sensor 200 may detect a heat source generated in a certain area in the vehicle 100.

The temperature sensor 200 outputs the information regarding the detected heat source (hereinafter referred to as "heat source information") to the left-behind detection device 1. The heat source information includes, for example, information specifying the temperature sensor 200 that has detected the heat source, and information related to the detected temperature, the detected position, and the size of the heat source.

The imaging device 300 is, for example, a camera and captures an image of the inside of the vehicle 100. The imaging device 300 is installed for the purpose of monitoring the inside of the vehicle 100 and is installed so that the entire area inside the vehicle 100 can be captured. The imaging device 300 outputs a captured image capturing the inside of the vehicle 100 to the left-behind detection device 1.

The left-behind detection device 1 detects a left-behind object that is left behind in the vehicle 100, on the basis of the heat source information acquired from the temperature sensor 200 and the captured image acquired from the imaging device 300. In the first embodiment, a person or an animal can be a left-behind object to be detected by the left-behind detection device 1. In the following description, a person or an animal is collectively referred to as a "living body".

The left-behind detection device 1 can also set a certain living body as a left-behind object. As a specific example, the left-behind detection device 1 can also set, for example, a toddler, an elderly person, a person requiring care, or a dog, as a left-behind object.

The left-behind detection device 1 includes a vehicle information acquiring unit 11, a heat source information acquiring unit 12, a stop determining unit 13, a heat source determining unit 14, an activation control unit 15, an image acquiring unit 16, and a notification control unit 17.

The vehicle information acquiring unit 11 acquires information related to the vehicle 100. In the first embodiment, the information related to the vehicle 100 is information such as the vehicle speed or the shift position and is required to at least allow determination as to whether or not the vehicle 100 is stopped or traveling. In the following description, information related to the vehicle 100 is referred to as "vehicle information".

The vehicle information acquiring unit 11 outputs the acquired vehicle information to the stop determining unit 13.

The heat source information acquiring unit 12 acquires heat source information from the temperature sensor 200.

The heat source information acquiring unit 12 outputs the acquired heat source information to the heat source determining unit 14.

The stop determining unit 13 determines whether or not the vehicle 100 is stopped on the basis of the vehicle information acquired by the vehicle information acquiring unit 11.

The stop determining unit 13 outputs a determination result indicating that the vehicle 100 is stopped to the heat source determining unit 14 when having determined that the vehicle 100 is stopped.

The heat source determining unit 14 determines whether or not a heat source satisfying target conditions is generated in the vehicle 100 on the basis of the heat source information acquired by the heat source information acquiring unit 12, when the stop determining unit 13 determines that the vehicle 100 is stopped. Specifically, the heat source determining unit 14 determines that the heat source satisfying the target conditions is generated, on the basis of the heat source information acquired by the heat source information acquiring unit 12, in a case where the heat source having a temperature within a certain range (hereinafter, referred to as the "first range") is generated in the vehicle 100. The first range can be set as appropriate by a user such as a driver of the vehicle 100. The heat source determining unit 14 narrows down what seems to be a living body by determining whether or not a heat source satisfying the target conditions is generated.

The heat source determining unit 14 outputs the determination result indicating that the heat source satisfying the target conditions is generated, to the activation control unit 15, when the heat source determining unit 14 determines that the heat source satisfying the target conditions is generated.

The activation control unit 15 activates the imaging device 300, when the stop determining unit 13 determines that the vehicle 100 is stopped and the heat source determining unit 14 determines that a heat source satisfying the target conditions is generated.

The image acquiring unit 16 acquires a captured image capturing the inside of the vehicle 100 from the imaging device 300 activated by the activation control unit 15.

The image acquiring unit 16 outputs the acquired captured image to the notification control unit 17.

The notification control unit 17 determines whether or not a living body is detected in the captured image acquired by the image acquiring unit 16, and outputs notification information to the outside of the vehicle when a living body is detected. Note that, in the first embodiment, the notification control unit 17 sets the entire area of the captured image acquired by the image acquiring unit 16 as a target area for which determination as to whether or not a living body is detected is to be made (hereinafter referred to as "detection area").

The notification control unit 17 is only required to detect a living body in the captured image using, for example, existing image processing technology.

In a case where a specific living body is targeted as the left-behind object, for example, a user registers in advance an image of the face of the specific living body in a storage unit (not illustrated). The notification control unit 17 detects the specific living body by matching the captured image and the registered image using existing image processing technology. Furthermore, for example in a case where a toddler or an elderly person is detected as the specific living body, the notification control unit 17 may use existing image-based age estimation technology to detect the toddler or the elderly person.

In the first embodiment, the notification information output by the notification control unit 17 is, for example, sound or a message that notifies that a living body is left behind in the vehicle 100. For example, the notification control unit 17 outputs sound that notifies that a living body is left behind in the vehicle 100 from an audio output device (not illustrated) such as a speaker installed in the vehicle 100. Furthermore, for example, the notification control unit 17 transmits an email notifying that a living body is left behind in the vehicle 100 to an information terminal carried by the user. Note that the above example is merely an example, and that it is only required that the notification control unit 17 notifies the outside of the vehicle 100 that the living body is left behind in the vehicle 100 by some approach and that a person who has detected the notification output by the notification control unit 17 can grasp that there is a living body left behind and take some action to rescue the living body.

The operation of the left-behind detection device 1 according to the first embodiment will be described.

Figure 2:
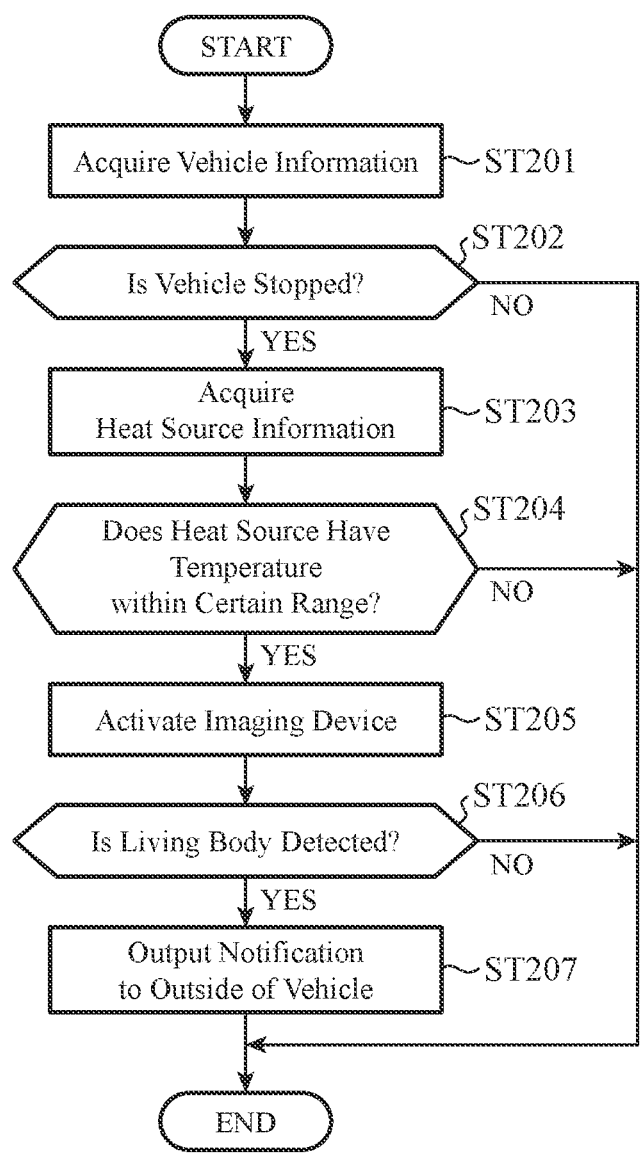
FIG. 2 is a flowchart for explaining the operation of the left-behind detection device according to the first embodiment.

FIG. 2 is a flowchart for explaining the operation of the left-behind detection device 1 according to the first embodiment.

The vehicle information acquiring unit 11 acquires vehicle information (step ST201).

The vehicle information acquiring unit 11 outputs the acquired vehicle information to the stop determining unit 13.

The stop determining unit 13 determines whether or not the vehicle 100 is stopped on the basis of the vehicle information acquired by the vehicle information acquiring unit 11 in step ST201 (step ST202).

In step ST202, if the stop determining unit 13 determines that the vehicle 100 is not stopped (if "NO" in step ST202), the process ends.

In step ST202, if the stop determining unit 13 determines that the vehicle 100 is stopped (in the case of "YES" in step ST202), the stop determining unit 13 outputs the determination result indicating that the vehicle 100 is stopped, to the heat source determining unit 14.

The heat source information acquiring unit 12 acquires heat source information from the temperature sensor 200 (step ST203).

The heat source information acquiring unit 12 outputs the acquired heat source information to the heat source determining unit 14.

The heat source determining unit 14 determines whether or not a heat source satisfying target conditions is generated in the vehicle 100, on the basis of the heat source information acquired by the heat source information acquiring unit 12 in step ST203. Specifically, the heat source determining unit 14 determines whether or not a heat source having a temperature within the first range is generated in the vehicle 100 on the basis of the heat source information acquired by the heat source information acquiring unit 12 (step ST204).

In step ST204, if the heat source determining unit 14 determines that no heat source having a temperature within the first range is not generated (if "NO" in step ST204), the process ends.

In step ST204, if the heat source determining unit 14 determines that a heat source having a temperature within the first range is generated (if "YES" in step ST204), the heat source determining unit 14 outputs, to the activation control unit 15, the determination result indicating that a heat source satisfying the target conditions is generated.

The activation control unit 15 activates the imaging device 300 (step ST205), and the image acquiring unit 16 acquires the captured image capturing the inside of the vehicle 100 from the imaging device 300 activated by the activation control unit 15. The image acquiring unit 16 outputs the acquired captured image to the notification control unit 17.

The notification control unit 17 determines whether or not a living body is detected in the captured image acquired by the image acquiring unit 16 (step ST206).

In step ST206, if the notification control unit 17 does not detect a living body (if "NO" in step ST206), the process ends.

If a living body is detected in step ST206 ("YES" in step ST206), the notification control unit 17 outputs notification information to the outside of the vehicle (step ST207).

As described above, the left-behind detection device 1 according to the first embodiment narrows down what seems to be a living body in the vehicle 100 before activation of the imaging device, depending on whether or not a heat source satisfying the target condition is detected in the vehicle 100, on the basis of the heat source information acquired from the temperature sensor 200.

Detection of a living body with a mass sensor as in the above-mentioned conventional technology has a low accuracy in terms of living body detection, whereas the left-behind detection device 1 according to the first embodiment determines whether or not there is a living body by detecting a heat source as described above, and thus it is possible to detect a living body in the vehicle 100 with high accuracy. Moreover, a plurality of mass sensors needs to be installed for each of the seats in the vehicle, whereas it is not required that the temperature sensor 200 be installed for each of the seats of the vehicle 100, and thus it is possible to reduce the number of sensors for detecting a living body in the vehicle 100.

Furthermore, the left-behind detection device 1 narrows down what seems to be a living body in the vehicle 100 on the basis of the heat source information acquired from the temperature sensor 200, then activates the imaging device, and performs detection of a living body based on the captured image captured by the imaging device. As a result, it is possible to prevent unnecessary activation of the imaging device 300 and to suppress power consumption of the imaging device 300.

The left-behind detection device 1 can further improve the detection accuracy of a living body, by performing both of detection of a living body based on the heat source information acquired from the temperature sensor 200 and detection of a living body based on the captured image captured by the imaging device 300, thereby eliminating uncertainties in the detection of a living body based on the heat source information.

In the first embodiment described above, in the left-behind detection device 1, the heat source determining unit 14 determines that a heat source satisfying the target conditions is generated, when a heat source having a temperature within the first range is generated in the vehicle 100.

It is possible to set more detailed target conditions in the left-behind detection device 1, which will be described below. On the basis of more detailed target conditions, the heat source determining unit 14 determines whether or not a heat source satisfying the target conditions is generated, so that the activation control unit 15 can further reduce unnecessary activation of the imaging device 300 and can activate the imaging device 300 at more appropriate timing.

Hereinafter, the operation of the left-behind detection device 1 will be described with some examples in a case where, on the basis of more detailed target conditions, the heat source determining unit 14 determines whether or not a heat source satisfying the target conditions is generated.

Figure 3:
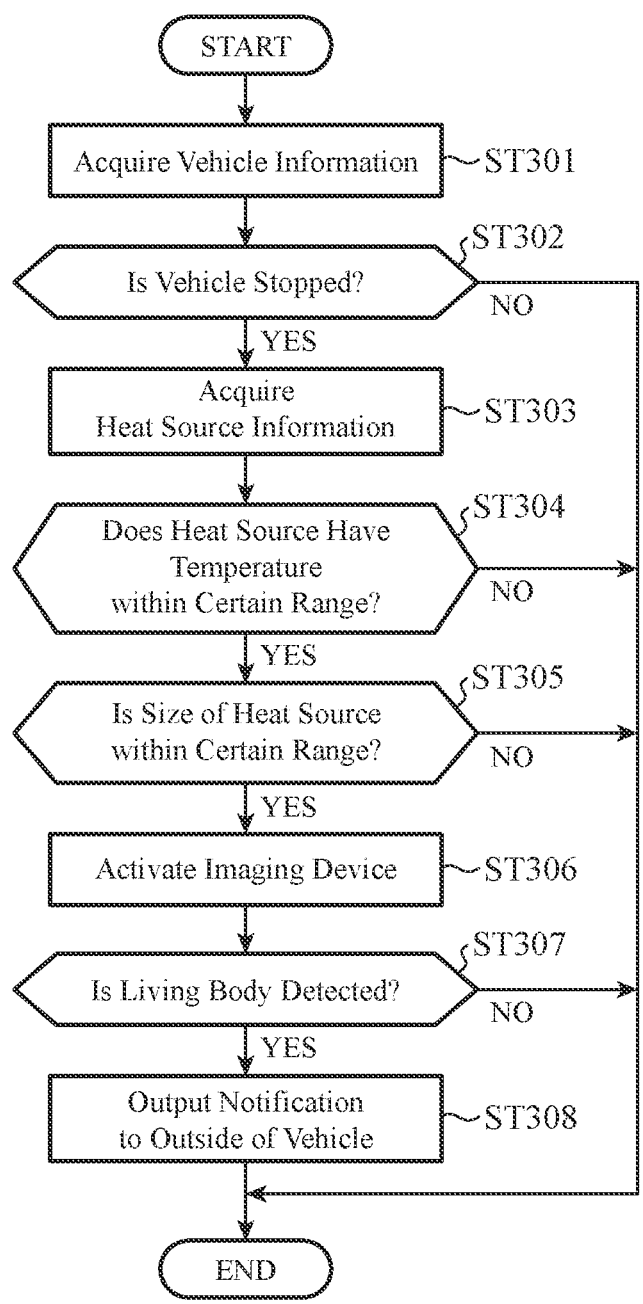
FIG. 3 is a flowchart for explaining an example of the operation in a case where a condition other than the temperature being within a first range is added to target conditions for determining that a heat source is generated in the left-behind detection device according to the first embodiment to obtain more detailed conditions from the target conditions.

FIG. 3 is a flowchart for explaining an example of the operation in a case where a condition other than the temperature being within the first range is added to target conditions for determining that a heat source is generated in the left-behind detection device 1 according to the first embodiment to obtain more detailed conditions from the target conditions. Note that even when the operation like the example illustrated in FIG. 3 is performed, the configuration example of the left-behind detection device 1 is similar to that illustrated in FIG. 1.

The specific operations in steps ST301 to ST304 and ST306 to ST308 in FIG. 3 are similar to the specific operations in steps ST201 to ST207 in FIG. 2 described above, respectively, and thus redundant description is omitted.

Here, the operation of step ST305, which is added to the operation described in FIG. 2, will be described.

In step ST304, if the heat source determining unit 14 determines that a heat source having a temperature within the first range is generated (if "YES" in step ST304), the heat source determining unit 14 determines whether or not the size of the heat source is within a certain range (hereinafter referred to as the "second range") (step ST305). The second range can be set as appropriate by a user. The user sets the second range so that the size of the second range is assumed to be about the size of a living body.

In step ST305, if the heat source determining unit 14 determines that the size of the heat source is not within the second range (if "NO" in step ST305), the process ends.

In step ST305, if the heat source determining unit 14 determines that the size of the heat source is within the second range (if "YES" in step ST305), the heat source determining unit 14 outputs, to the activation control unit 15, the determination result indicating that a heat source satisfying the target conditions is generated, and the process proceeds to step ST306.

In this manner, the heat source determining unit 14 may determine that a heat source satisfying the target conditions is generated, when a heat source having a temperature within the first range is generated in the vehicle 100 and the size of the heat source is within the second range.

By adding, to the target conditions, a condition as to whether or not the generated heat source has a size within the second range, the determining unit 14 does not determine the heat source as a living body in a case where the detected heat source exceeds the size of a living body, so that it is possible to improve the detection accuracy of a living body based on the heat source information. Furthermore, in the subsequent processing, the activation control unit 15 can further reduce unnecessary activation of the imaging device 300 and can activate the imaging device 300 at more appropriate timing.

Figure 4:
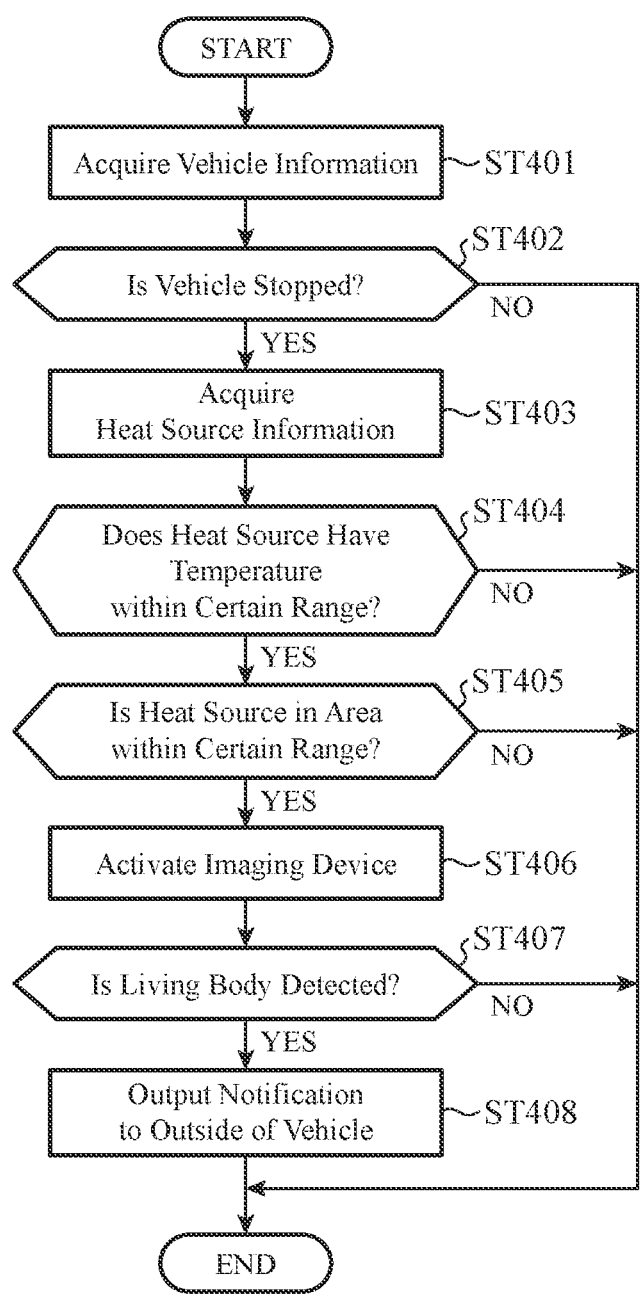
FIG. 4 is a flowchart for explaining another example of the operation in a case where a condition other than the temperature being within a first range is added to target conditions for determining that a heat source is generated in the left-behind detection device according to the first embodiment to obtain more detailed conditions from the target conditions.

FIG. 4 is a flowchart for explaining another example of the operation in a case where a condition other than the temperature being within the first range is added to the target conditions for determining that a heat source is generated in the left-behind detection device 1 according to the first embodiment to obtain more detailed conditions from the target conditions. Note that even when the operation like the example illustrated in FIG. 4 is performed, the configuration example of the left-behind detection device 1 is similar to that illustrated in FIG. 1.

The specific operations in steps ST401 to ST404 and ST406 to ST408 in FIG. 4 are similar to the specific operations in steps ST201 to ST207 in FIG. 2 described above, respectively, and thus redundant description is omitted.

Here, the operation of step ST405, which is added to the operation described in FIG. 2, will be described.

In step ST404, if the heat source determining unit 14 determines that a heat source having a temperature within the first range is generated (if "YES" in step ST404), the heat source determining unit 14 determines whether or not the heat source is generated within an area of a certain range in the vehicle 100 (hereinafter referred to as the "third range") (step ST405). The third range can be set as appropriate by a user. The user sets the third range so that an area of the third range is assumed to be an area where a living body can be detected in the vehicle 100.

In step ST405, if the heat source determining unit 14 determines that the heat source is not generated in the area of the third range (if "NO" in step ST405), the process ends.

In step ST405, if the heat source determining unit 14 determines that the heat source is generated in the area of the third range (if "YES" in step ST405), the heat source determining unit 14 outputs, to the activation control unit 15, the determination result indicating that a heat source satisfying the target conditions is generated, and the process proceeds to step ST406.

In this manner, the heat source determining unit 14 may determine that a heat source satisfying the target conditions is generated, when a heat source having a temperature within the first range is generated in the vehicle 100 and the heat source is generated within an area of a third range in the vehicle 100.

By adding, to the target conditions, a condition as to whether or not the heat source is generated within an area of a third range in the vehicle 100, the heat source determining unit 14 does not determine the heat source as a living body in a case where the detected heat source is outside an area where it is assumed that a living body can be detected, so that it is possible to improve the detection accuracy of a living body based on the heat source information. Furthermore, in the subsequent processing, the activation control unit 15 can further reduce unnecessary activation of the imaging device 300 and can activate the imaging device 300 at more appropriate timing.

Figure 5:
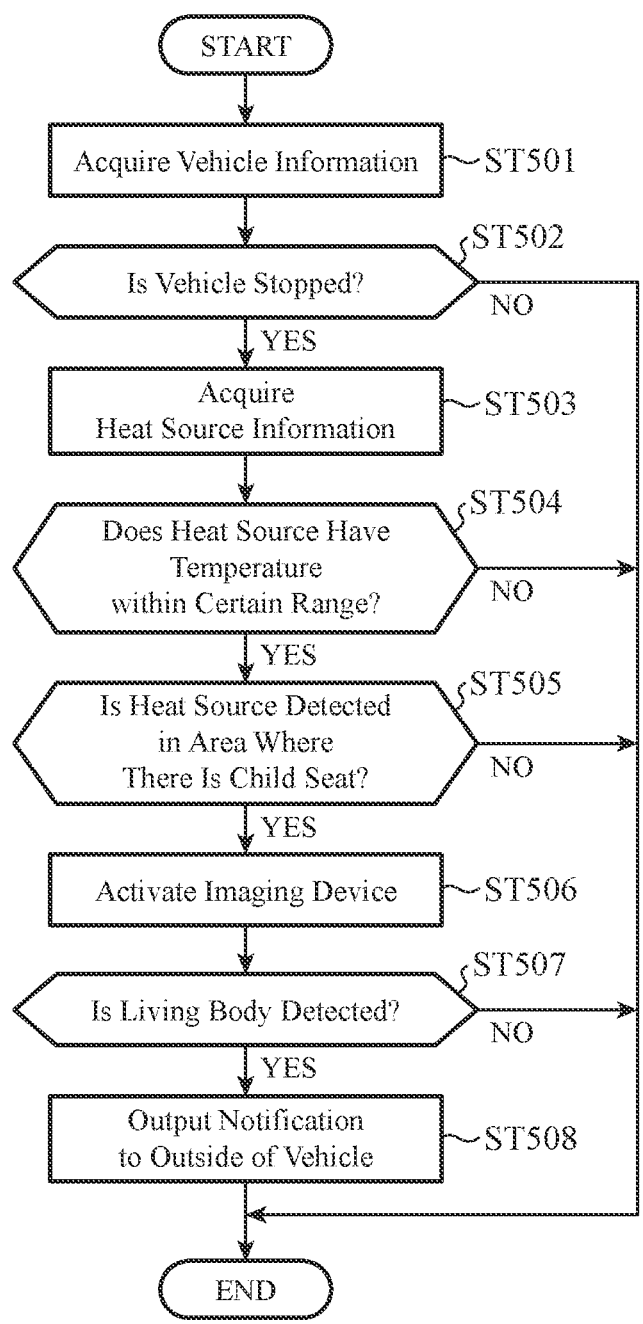
FIG. 5 is a flowchart for explaining another example of the operation in a case where a condition other than the temperature being within a first range is added to target conditions for determining that a heat source is generated in the left-behind detection device according to the first embodiment to obtain more detailed conditions from the target conditions.

FIG. 5 is a flowchart for explaining another example of the operation in a case where a condition other than the temperature being within the first range is added to the target conditions for determining that a heat source is generated in the left-behind detection device 1 according to the first embodiment to obtain more detailed conditions from the target conditions.

Figure 6:
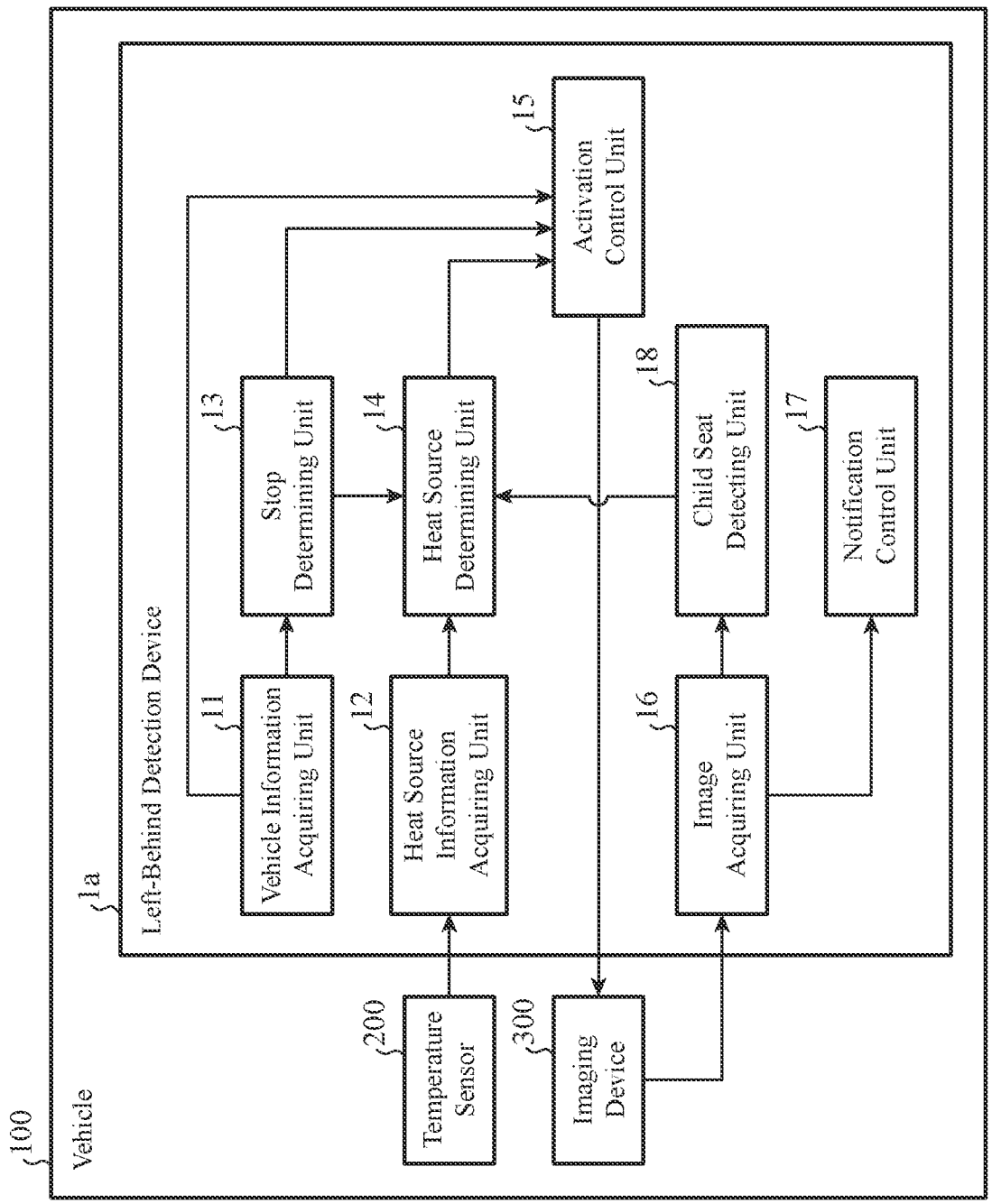
FIG. 6 is a diagram illustrating a configuration example of a left-behind detection device including a child seat detecting unit in the first embodiment.

In a case where the operation of the example as illustrated in FIG. 5 is performed, the left-behind detection device 1 is assumed to have a configuration as illustrated in FIG. 6, for example.

A left-behind detection device 1*a* illustrated in FIG. 6 is different from the left-behind detection device 1 described with reference to FIG. 1 in that a child seat detecting unit 18 is further included. Since the other components are similar to those of the left-behind detection device 1 described with reference to FIG. 1, the same components are denoted by the same symbols, and redundant description is omitted. Note that, in the left-behind detection device 1*a*, the vehicle information acquiring unit 11 outputs the acquired vehicle information to the stop determining unit 13 and the activation control unit 15, and the stop determining unit 13 outputs the determination result indicating that the vehicle 100 is stopped to the heat source determining unit 14 and the activation control unit 15. Furthermore, the image acquiring unit 16 outputs the acquired captured image to the child seat detecting unit 18.

It is assumed that the activation control unit 15 activates the imaging device 300 while the vehicle 100 is traveling, and temporarily stops the imaging device 300 when the vehicle 100 stops.

The child seat detecting unit 18 detects a child seat, on the basis of the captured image acquired by the image acquiring unit 16 while the vehicle 100 is traveling.

The activation control unit 15 acquires the vehicle information from the vehicle information acquiring unit 11 and determines whether or not the vehicle 100 is traveling on the basis of the acquired vehicle information, and activates the imaging device 300 when it is determined that the vehicle 100 is traveling. When the imaging device 300 is activated while the vehicle 100 is traveling, the image acquiring unit 16 acquires a captured image from the imaging device 300 and outputs the captured image to the child seat detecting unit 18. The child seat detecting unit 18 detects a child seat installed in the vehicle 100, on the basis of the captured image output from the image acquiring unit 16 while the vehicle 100 is traveling. The child seat detecting unit 18 is only required to detect a child seat using, for example, existing image processing.

When the child seat detecting unit 18 detects a child seat, the child seat detecting unit 18 outputs information of the area where the child seat is installed in the captured image, to the heat source determining unit 14.

The heat source determining unit 14 narrows down what seems to be a living body, on the basis of the heat source information output from the heat source information acquiring unit 12 and the information of the area where the child seat is installed, the information of the area being output from the child seat detecting unit 18.

Hereinafter, the specific operation of the left-behind detection device 1a will be described with reference to the flowchart of FIG. 5.

In the left-behind detection device 1a described here, the child seat detecting unit detects the child seat installed in the vehicle 100 while the vehicle 100 is traveling before the operation of FIG. 5 is performed.

Specifically, when the activation control unit 15 determines that the vehicle 100 is traveling on the basis of the vehicle information acquired from the vehicle information acquiring unit 11, the activation control unit 15 activates the imaging device 300.

When the imaging device 300 is activated while the vehicle 100 is traveling, the image acquiring unit 16 outputs the captured image acquired from the imaging device 300 to the child seat detecting unit 18.

Then, the child seat detecting unit 18 detects the child seat installed in the vehicle 100, on the basis of the captured image having been output from the image acquiring unit 16 while the vehicle 100 has been traveling, and outputs information of the area where the child seat is installed in the captured image, to the heat source determining unit 14.

It is assumed that the heat source determining unit 14 stores the information of the area where the child seat is installed in the captured image, in a location where the heat source determining unit 14 can refer to, the information of the area being output from the child seat detecting unit 18. Note that it is ensured that the heat source determining unit 14 stores the most recent information regarding the area of the child seat, the most recent information being output from the child seat detecting unit 18.

After that, when the vehicle 100 is stopped, the activation control unit 15 acquires information indicating that the vehicle 100 is stopped, from the stop determining unit 13, and temporarily stops the imaging device 300.

The specific operations in steps ST501 to ST504 and ST506 to ST508 in FIG. 5 are similar to the specific operations in steps ST201 to ST207 in FIG. 2 described above, respectively, and thus redundant description is omitted.

Here, the operation of step ST505, which is added to the operation described in FIG. 2, will be described.

In step ST504, if the heat source determining unit 14 determines that a heat source having a temperature within the first range is generated (in the case of "YES" in step ST504), the heat source determining unit 14 determines whether or not the heat source is generated within an area where the child seat is installed in the vehicle 100 (step ST505). For example, in a case where the positional relationship between areas in the captured image and areas inside the vehicle 100 is stored in advance at a location where the heat source determining unit 14 can refer to, the heat source determining unit 14 is only required to convert the stored information of area in the captured image where the child seat is installed, to information of the area in the vehicle 100 where the child seat is installed, on the basis of the stored information of the positional relationship, and to thereby perform the determination of step ST504 described above.

In step ST505, if the heat source determining unit 14 determines that the heat source is not generated in the area in the vehicle 100 where the child seat is installed (if "NO" in step ST505), the process ends.

In step ST505, if the heat source determining unit 14 determines that the heat source is generated in the area in the vehicle 100 where the child seat is installed (if "YES" in step ST505), the heat source determining unit 14 determines that a heat source satisfying the target conditions is generated and outputs, to the activation control unit 15, the determination result indicating that a heat source satisfying the target conditions is generated, and the process proceeds to step ST506.

In this manner, the heat source determining unit 14 may determine that a heat source satisfying the target conditions is generated, when the heat source determining unit 14 determines that a heat source having a temperature within the first range is generated in the vehicle 100, and that the heat source is generated in the area in the vehicle 100 where the child seat is installed.

In the heat source determining unit 14, by adding, to the target conditions, a condition as to whether or not the heat source is generated in the area in the vehicle 100 where the child seat is installed, it is possible to improve the detection accuracy of a living body based on the heat source information. Furthermore, in the subsequent processing, the activation control unit 15 can further reduce unnecessary activation of the imaging device 300 and can activate the imaging device 300 at more appropriate timing.

In the above description with reference to FIGS. 5 and 6, the left-behind detection device 1a includes the child seat detecting unit 18, and the child seat detecting unit 18 detects the child seat installed in the vehicle 100; however, this is merely an example, and a left-behind detection device 1 does not necessarily include a child seat detecting unit 18.

If, for example, a user has previously registered information regarding the installation position of a child seat in the left-behind detection device 1, and the heat source determining unit 14 can determine the area in the vehicle 100 where the child seat is installed on the basis of the registered information, the child seat detecting unit 18 may not be included, and the left-behind detection device 1 as described with reference to FIG. 1 may be configured.

The operation of the left-behind detection device 1 described with reference to each of FIGS. 3 and 4 and the operation of the left-behind detection device 1a described with reference to FIGS. 5 and 6 may be combined.

For example, the heat source determining unit 14 may determine that a heat source satisfying the target conditions is generated, when the heat source having a temperature within the first range is generated in the vehicle 100, the size of the heat source is within the second range, and the heat source is generated within an area of a third range in the vehicle 100.

Furthermore, for example, the heat source determining unit 14 may determine that a heat source satisfying the target conditions is generated, when the heat source having a temperature within the first range is generated in the vehicle 100, the size of the heat source is within the second range, and the heat source is generated in the area in the vehicle 100 where the child seat is installed.

Figure 7A:
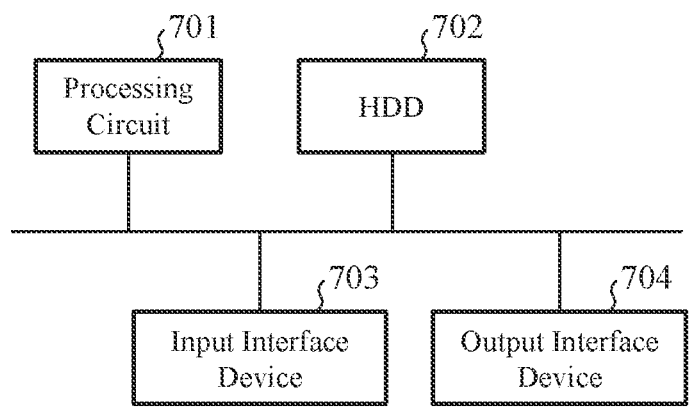
FIGS. 7A and 7B are diagrams each illustrating an exemplary hardware configuration of the left-behind detection device according to the first embodiment.
Figure 7B:
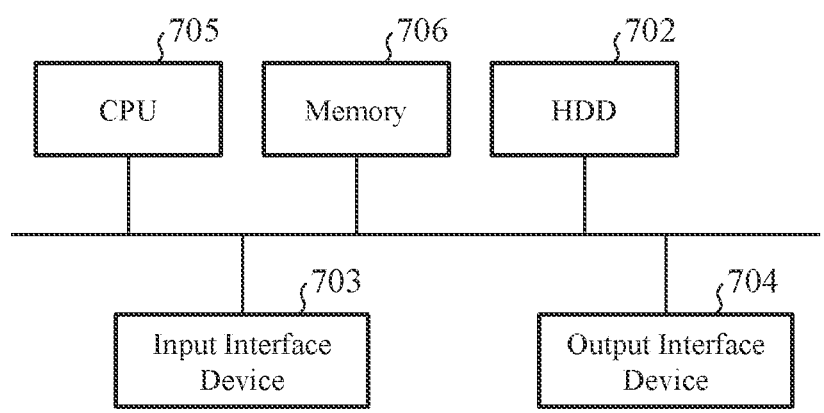

FIGS. 7A and 7B are diagrams each illustrating an exemplary hardware configuration of the left-behind detection devices 1 and 1a according to the first embodiment.

In the first embodiment, the functions of the vehicle information acquiring unit 11, the heat source information acquiring unit 12, the stop determining unit 13, the heat source determining unit 14, the activation control unit 15, the image acquiring unit 16, the notification control unit 17, and the child seat detecting unit 18 are implemented by a processing circuit 701. That is, the left-behind detection devices 1 and 1a each include the processing circuit 701 for performing control to detect a living body left behind in the vehicle 100 and provide notification to the outside of the vehicle.

The processing circuit 701 may be dedicated hardware as illustrated in FIG. 7A or may be a central processing unit (CPU) 705 for executing a program stored in a memory 706 as illustrated in FIG. 7B.

In a case where the processing circuit 701 is dedicated hardware, the processing circuit 701 corresponds to, for example, a single circuit, a composite circuit, a programmed processor, a parallel programmed processor, an application specific integrated circuit (ASIC), a field-programmable gate array (FPGA), or a combination thereof.

In a case where the processing circuit 701 corresponds to the CPU 705, the functions of the vehicle information acquiring unit 11, the heat source information acquiring unit 12, the stop determining unit 13, the heat source determining unit 14, the activation control unit 15, the image acquiring unit 16, the notification control unit 17, and the child seat detecting unit 18 are implemented by software, firmware, or a combination of software and firmware. That is, the vehicle information acquiring unit 11, the heat source information acquiring unit 12, the stop determining unit 13, the heat source determining unit 14, the activation control unit 15, the image acquiring unit 16, the notification control unit 17, and the child seat detecting unit 18 are implemented by a processing circuit such as the CPU 705 or a system large-scale integration (LSI) that executes programs stored in a hard disk drive (HDD) 702, the memory 706, or the like. It can also be said that the programs stored in the HDD 702, the memory 706, or the like cause a computer to execute the procedures or methods of the vehicle information acquiring unit 11, the heat source information acquiring unit 12, the stop determining unit 13, the heat source determining unit 14, the activation control unit 15, the image acquiring unit 16, the notification control unit 17, and the child seat detecting unit 18. Here, the memory 706 corresponds to, for example, a nonvolatile or volatile semiconductor memory such as a random access memory (RAM), a read only memory (ROM), a flash memory, an erasable programmable read only memory (EPROM), or an electrically erasable programmable read only memory (EEPROM), a magnetic disc, a flexible disc, an optical disc, a compact disc, a mini disc, or a digital versatile disc (DVD).

Note that some of the functions of the vehicle information acquiring unit 11, the heat source information acquiring unit 12, the stop determining unit 13, the heat source determining unit 14, the activation control unit 15, the image acquiring unit 16, the notification control unit 17, and the child seat detecting unit 18 may be implemented by dedicated hardware, and some of the functions may be implemented by software or firmware. For example, the functions of the vehicle information acquiring unit 11 and the heat source information acquiring unit 12 can be implemented by the processing circuit 701 as dedicated hardware, and the functions of the stop determining unit 13, the heat source determining unit 14, the activation control unit 15, the image acquiring unit 16, the notification control unit 17, and the child seat detecting unit 18 can be implemented by the processing circuit reading and executing programs stored in the memory 706.

The left-behind detection devices 1 and 1a each further include an input interface device 703 and an output interface device 704 for performing wired communication or wireless communication with a device such as the temperature sensor 200 or the imaging device 300.

As described above, the left-behind detection devices 1 and 1a according to the first embodiment each include: the vehicle information acquiring unit 11 for acquiring vehicle information related to the vehicle 100; the heat source information acquiring unit 12 for acquiring heat source information related to a heat source in the vehicle 100; the stop determining unit 13 for determining whether or not the vehicle 100 is stopped on the basis of the vehicle information acquired by the vehicle information acquiring unit 11; the heat source determining unit 14 for determining whether or not a heat source satisfying a target condition is generated in the vehicle 100 on the basis of the heat source information acquired by the heat source information acquiring unit 12, when the stop determining unit 13 determines that the vehicle 100 is stopped; the activation control unit 15 for activating the imaging device 300, when the heat source determining unit 14 determines that a heat source satisfying the target condition is generated; the image acquiring unit 16 for acquiring a captured image capturing the inside of the vehicle 100 from the imaging device 300 activated by the activation control unit 15; and the notification control unit 17 for outputting notification information to the outside of the vehicle, when a living body is detected in the captured image acquired by the image acquiring unit 16. Therefore, it is possible to detect the presence of a living body left behind in the vehicle 100 before activation of the imaging device.

Second Embodiment

In the first embodiment, the left-behind detection devices 1 and 1a each set the entire area of a captured image as the detection area, when detecting a living body in the captured image acquired from the imaging device 300.

In a second embodiment, an embodiment will be described in which the detection area is narrowed down.

Figure 8:
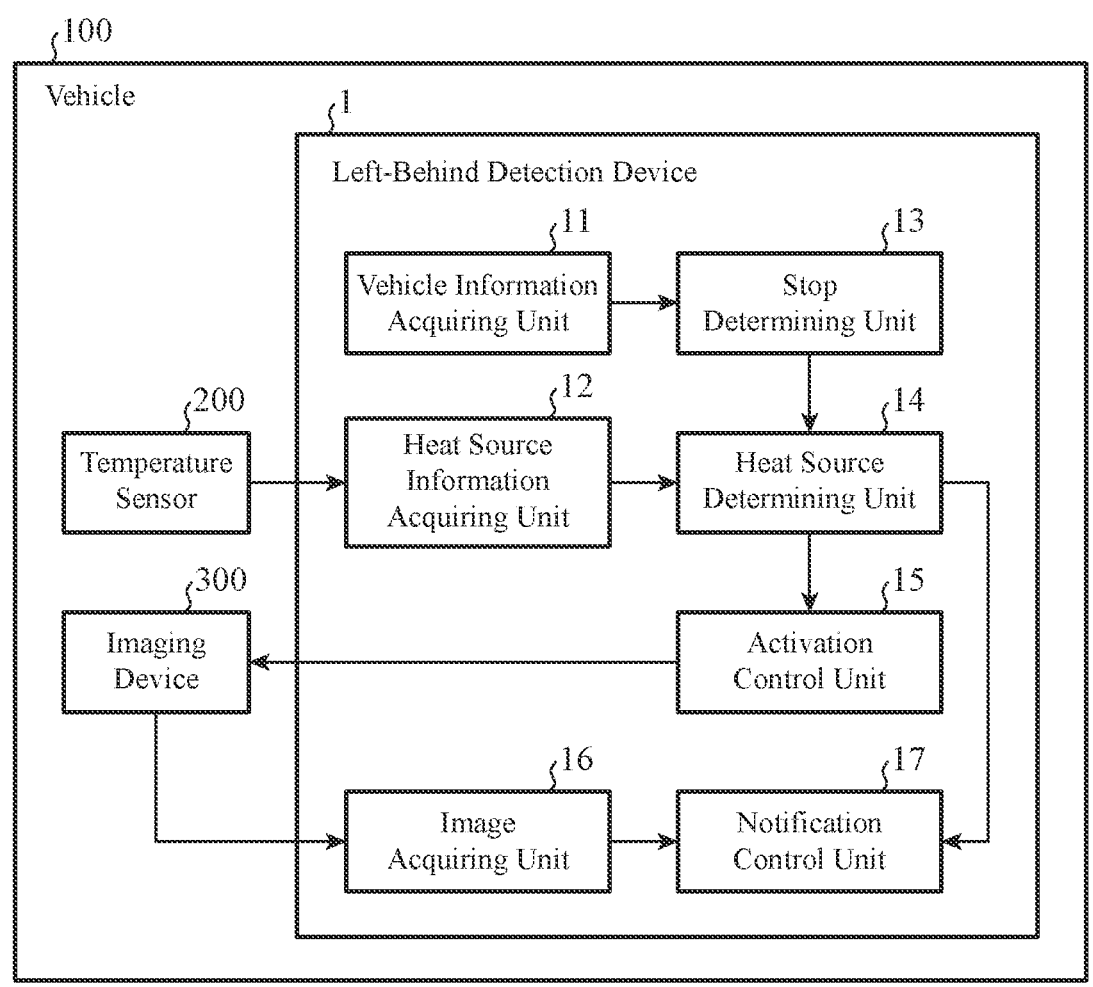
FIG. 8 is a diagram illustrating a configuration example of a left-behind detection device according to a second embodiment.

FIG. 8 is a diagram illustrating a configuration example of a left-behind detection device 1 according to the second embodiment.

In FIG. 8, components similar to those of the left-behind detection device 1 described with reference to FIG. 1 in the first embodiment are denoted by the same symbols, and redundant description is omitted. The left-behind detection device 1 according to the second embodiment is different from the left-behind detection device 1 according to the first embodiment in the output destination of information of the heat source determining unit 14. Specifically, when the heat source determining unit 14 determines that a heat source satisfying the target conditions is generated, the heat source determining unit 14 outputs the heat source information acquired from the heat source information acquiring unit 12 to the notification control unit 17 together with the determination result indicating that the heat source satisfying the target conditions is generated. Note that the configuration example of the left-behind detection device according to the second embodiment may be the one as described in the first embodiment with reference to FIG. 6.

The hardware configurations of the left-behind detection device 1 according to the second embodiment are similar to the hardware configurations described in the first embodiment with reference to FIGS. 7A and 7B, and thus redundant description is omitted.

The left-behind detection device 1 according to the second embodiment is different from the left-behind detection device 1 according to the first embodiment in the specific operation of the notification control unit 17.

Hereinafter, the specific operation of the left-behind detection device 1 according to the second embodiment will be described.

Figure 9:
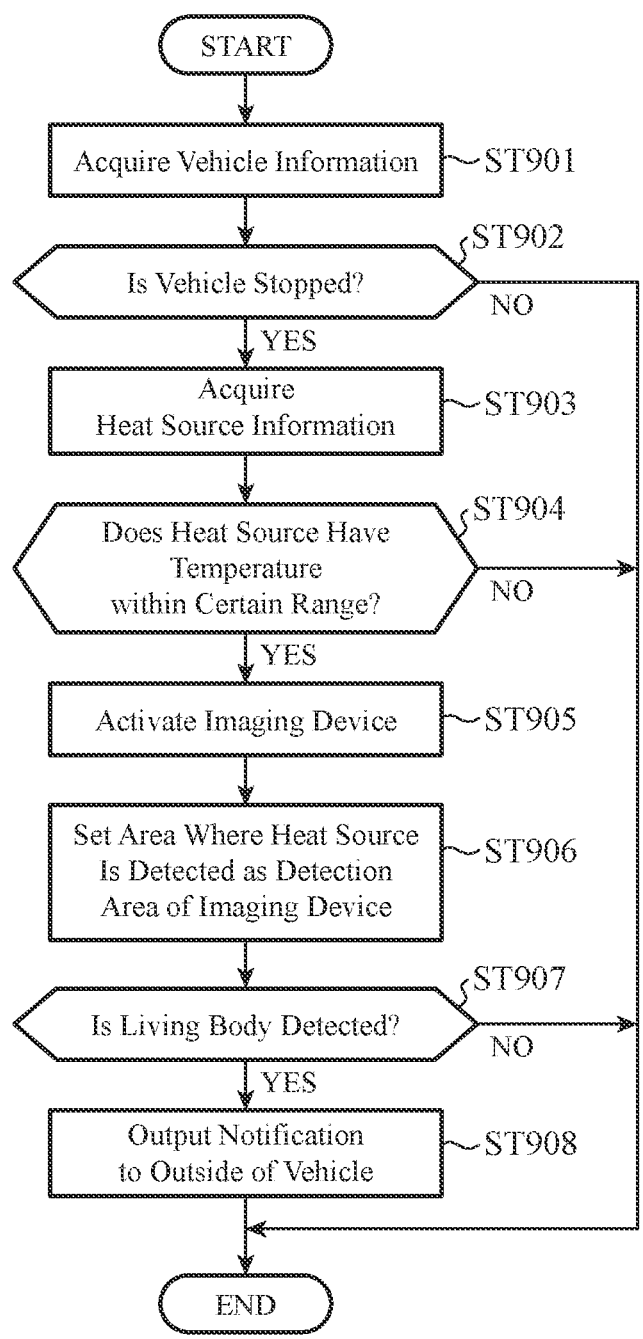
FIG. 9 is a flowchart for explaining the operation of the left-behind detection device according to the second embodiment.

FIG. 9 is a flowchart for explaining the operation of the left-behind detection device 1 according to the second embodiment.

The specific operations in steps ST901 to ST905 and ST908 in FIG. 9 are similar to the specific operations in steps ST201 to ST205 and ST207 in FIG. 2 described in the first embodiment, respectively, and thus redundant description is omitted.

Here, the operations of steps ST906 to ST907, which are added to the operations of FIG. 2 described in the first embodiment, will be described.

When the activation control unit 15 activates the imaging device 300 (step ST905), and the image acquiring unit 16 acquires a captured image capturing the inside of the vehicle 100 from the imaging device 300 activated by the activation control unit 15 and outputs the captured image to the notification control unit 17.

The notification control unit 17 sets, as a detection area in which a living body is to be detected, an area where the heat source generated in the vehicle 100 is captured from among areas in the captured image acquired by the image acquiring unit 16, on the basis of the heat source information output from the heat source determining unit 14 (step ST906).

The notification control unit 17 can determine the detection area in the captured image with a variable parameter. The notification control unit 17 specifies an area where the temperature sensor 200 has detected a heat source, on the basis of the heat source information output from the heat source determining unit 14, and sets a parameter so that the area where the heat source is detected and the detection area match. The term "match" used here is not limited to a perfect match, and it is only required that the parameter be set so that the area where the temperature sensor 200 has detected the heat source is included in the detection area and that the both areas have substantially the same size. Note that the heat source information includes information regarding the area in the vehicle 100 where the heat source has been detected. Furthermore, one or more areas in the vehicle 100 to be the target for the temperature sensor 200 to detect a heat source, and one or more areas in the captured image obtained by the imaging device 300 capturing the inside of the vehicle 100 are associated in advance, and information indicating the correspondence relationship is stored in a location where the notification control unit 17 can refer to.

When the detection area is set in step ST906, the notification control unit 17 determines whether or not a living body is detected in the detection area of the captured image acquired by the image acquiring unit 16 (step ST907).

In step ST907, if the notification control unit 17 does not detect a living body (if "NO" in step ST907), the process ends.

If a living body is detected in step ST907 ("YES" in step ST907), the notification control unit 17 outputs notification information to the outside of the vehicle (step ST908).

As described above, the left-behind detection device 1 according to the second embodiment narrows down what seems to be a living body in the vehicle 100 on the basis of the heat source information acquired from the temperature sensor 200, then activates the imaging device, sets, as a detection area, an area of the captured image that corresponds to an area where the temperature sensor 200 has detected a heat source, when performing detection of a living body based on the captured image captured by the imaging device, and performs detection of a living body in the detection area. Therefore, the left-behind detection device 1 can be prevented from performing unnecessary detection operation on the captured image.

As described above, in the left-behind detection devices 1 and 1a according to the second embodiment, the notification control unit 17 sets, as a detection area in which a living body is to be detected, an area where the heat source generated in the vehicle 100 is captured from among areas in the captured image acquired by the image acquiring unit 16, on the basis of the heat source information acquired by the heat source information acquiring unit 12. Therefore, it is possible to prevent unnecessary detection operation on the captured image, when detection of a living body based on the captured image captured by the imaging device is performed.

Third Embodiment

In the first embodiment, the left-behind detection devices 1 and 1a do not consider the movement of a heat source.

In a third embodiment, an embodiment will be described in which a living body id detected focusing on the movement of a heat source.

The configuration example of the left-behind detection device 1 according to the third embodiment is similar to the configuration example of the left-behind detection device 1 described in the second embodiment with reference to FIG. 8, and thus redundant description is omitted. However, in the left-behind detection device 1 according to the third embodiment, the content of information output from a heat source determining unit 14 to a notification control unit 17 is different. Specifically, in a case where a moving heat source is generated in the vehicle 100, the heat source determining unit 14 outputs information indicating that the moving heat source is generated, to the notification control unit 17. Note that the configuration example of the left-behind detection device according to the third embodiment may be the one as described in the first embodiment with reference to FIG. 6.

The hardware configurations of the left-behind detection device 1 according to the third embodiment are similar to the hardware configurations described in the first embodiment with reference to FIGS. 7A and 7B, and thus redundant description is omitted.

The left-behind detection device 1 according to the third embodiment is different from the left-behind detection device 1 according to the first embodiment in the specific operation of the heat source determining unit 14 and the notification control unit 17.

Hereinafter, the specific operation of the left-behind detection device 1 according to the third embodiment will be described.

Figure 10:
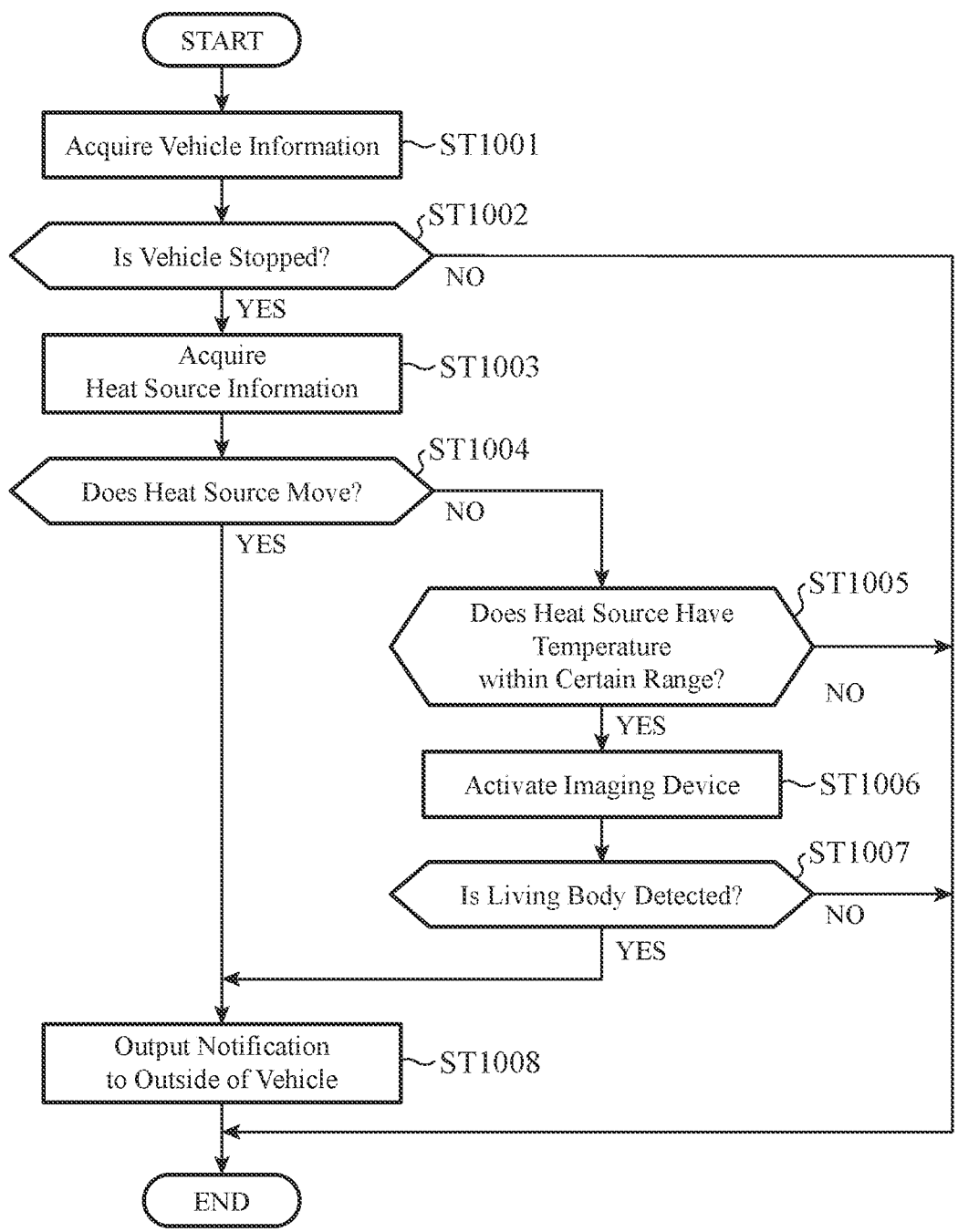
FIG. 10 is a flowchart for explaining the operation of a left-behind detection device according to a third embodiment.

FIG. 10 is a flowchart for explaining the operation of the left-behind detection device 1 according to the third embodiment.

The specific operations in steps ST1001 to ST1003 in FIG. 10 are similar to the specific operations in steps ST201 to ST203 in FIG. 2 described in the first embodiment, respectively, and thus redundant description is omitted.

When heat source information is acquired from a heat source information acquiring unit 12 in step ST1003, the heat source determining unit 14 determines whether or not a moving heat source is generated in a vehicle 100 on the basis of the heat source information (step ST1004). For example, the heat source determining unit 14 is only required to store the heat source information output from the heat source information acquiring unit 12, to compare the most recent heat source information with the heat source information output immediately before the most recent heat source information, and to determine whether or not the heat source moves. Note that this is merely an example, and the heat source determining unit 14 may determine whether or not a moving heat source is generated in the vehicle 100 by an appropriate approach on the basis of the heat source information output from the heat source information acquiring unit 12.

In step ST1004, if the heat source determining unit 14 determines that no moving heat source is generated (if "NO" in step ST1004), the process proceeds to step ST1005. The specific operations in subsequent steps ST1005 to ST1007 are similar to the specific operations in steps ST204 to ST206 in FIG. 2 described in the first embodiment, respectively, and thus hereinafter redundant description is omitted. Then, the process proceeds to step ST1008.

In step ST1004, if the heat source determining unit 14 determines that a moving heat source is generated (if "YES" in step ST1004), the heat source determining unit 14 outputs the information indicating that the moving heat source is generated, to the notification control unit 17. Then, the process proceeds to step ST1008.

The notification control unit 17 outputs notification information to the outside of the vehicle (step ST1008). The specific operation of step ST1008 is similar to the specific operation of step ST207 in FIG. 2 described in the first embodiment.

As described above, in the left-behind detection device 1 according to the third embodiment, when it is determined that the vehicle 100 is stopped and that a moving heat source is generated in the vehicle 100, notification information is output to the outside of the vehicle without activating the imaging device 300.

A moving heat source is likely to be a living body. Therefore, as described above, when it is determined that a moving heat source is generated in the vehicle 100, it is possible to immediately notify the outside of the vehicle that there is a living body left behind in the vehicle 100 by outputting the notification information to the outside of the vehicle without activating the imaging device 300. It is also possible to prevent unnecessary activation of the imaging device 300 and thus to suppress power consumption of the imaging device 300.

As described above, in the left-behind detection device 1 according to the third embodiment, it is configured that the heat source determining unit 14 determines whether or not the heat source generated in the vehicle 100 moves on the basis of the heat source information acquired by the heat source information acquiring unit 12, and in a case where the heat source determining unit 14 determines that the heat source generated in the vehicle 100 moves, the activation control unit 15 does not activate the imaging device and the notification control unit 17 outputs the notification information to the outside of the vehicle. Therefore, it is possible to immediately notify the outside of the vehicle that there is a living body left behind in the vehicle 100. It is also possible to prevent unnecessary activation of the imaging device 300 and thus to suppress power consumption of the imaging device 300.

Incidentally, within the scope of the present invention, the present invention may include a flexible combination of the embodiments, a modification of any component of the embodiments, or an omission of any component in the embodiments.

INDUSTRIAL APPLICABILITY

Since a left-behind detection device according to the present invention is configured so as to be capable of detecting the presence of a living body left behind in a vehicle before activation of an imaging device is activated, it is applicable to a left-behind detection device for detecting, for example, a person left behind in the vehicle.

REFERENCE SIGNS LIST 1, 1a: left-behind detection device, 11: vehicle information acquiring unit, 12: heat source information acquiring unit, 13: stop determining unit, 14: heat source determining unit, 15: activation control unit, 16: image acquiring unit, 17: notification control unit, 18: child seat detecting unit, 100: vehicle, 200: temperature sensor, 300: imaging device, 701: processing circuit, 702: HDD, 703: input interface device, 704: output interface device, 705: CPU, 706: memory

The invention claimed is:
1. A left-behind detection device comprising:
a processing circuitry to:
   acquire vehicle information related to a vehicle;
   acquire heat source information related to a heat source in the vehicle;
   determine whether or not the vehicle is stopped on a basis of the acquired vehicle information;
   determine whether or not a heat source satisfying a target condition is generated in the vehicle on a basis of the acquired heat source information, based on the determining that the vehicle is stopped;
   activate an imaging device, based on the determining that the heat source satisfying the target condition is generated;
   acquire a captured image capturing an inside of the vehicle via the activated imaging device; and output notification information to an outside of the vehicle, based on a living body being detected in the captured image, wherein the processing circuitry detects a child seat installed in the vehicle, on a basis of a captured image having been acquired from the imaging device, while the vehicle has been traveling, wherein the processing circuitry has activated the imaging device by determining that the vehicle has been traveling on a basis of the vehicle information acquired while the vehicle has been traveling before the processing circuitry determines that the vehicle is stopped, the processing circuitry stops the imaging device, based on the determining that the vehicle is stopped, and the processing circuitry activates the imaging device, based on determining that the heat source having a temperature within a first range is generated in the vehicle and that the heat source is generated in an area in the vehicle where the child seat detected is installed.

2. The left-behind detection device according to claim 1, wherein the living body is a toddler, a person requiring care, or an animal.

3. The left-behind detection device according to claim 1, wherein the processing circuitry further determines that the heat source satisfying the target condition is generated, based on the heat source having a size within a second range.

4. The left-behind detection device according to claim 1, wherein the processing circuitry determines whether or not the heat source satisfying the target condition is generated in the vehicle based on detecting that the heat source is generated in an area of the vehicle that is predetermined to be a target area, wherein the processing circuitry sets, as a detection area in which the living body is to be detected, the target area where the heat source is generated, among areas in the acquired captured image.

5. A left-behind detection method comprising:
acquiring vehicle information related to a vehicle;
acquiring heat source information related to a heat source in the vehicle;
determining whether or not the vehicle is stopped on a basis of the acquired vehicle information;
determining whether or not a heat source satisfying a target condition is generated in the vehicle on a basis of the acquired heat source information, based on the determining that the vehicle is stopped;
activating an imaging device, based on the determining that the heat source satisfying the target condition is generated;
acquiring a captured image capturing an inside of the vehicle via the activated imaging device; and
outputting notification information to an outside of the vehicle, based on a living body being detected in the captured image, wherein the method further comprises detecting a child seat installed in the vehicle, on a basis of a captured image having been acquired from the imaging device, while the vehicle has been traveling, wherein the method further comprises activating the imaging device based on determining that the vehicle has been traveling on a basis of the vehicle information acquired while the vehicle has been traveling before the processing circuitry determines that the vehicle is stopped, wherein the method further comprises stopping the imaging device, based on the determining that the vehicle is stopped, and wherein the method further comprises activating the imaging device, based on determining that the heat source having a temperature within a first range is generated in the vehicle and that the heat source is generated in an area in the vehicle where the child seat detected is installed.

* * * * *